United States Patent
Chang et al.

(10) Patent No.: US 12,289,420 B2
(45) Date of Patent: Apr. 29, 2025

(54) UNEVEN LOAD MITIGATION IN A MOBILE COMPUTING DEVICE HAVING MULTIPLE POWER STORAGE DEVICES

(71) Applicant: Google LLC, Mountain View, CA (US)

(72) Inventors: ChiaMing Chang, New Taipei (TW); Weichih Liao, Taoyuan (TW); JhengFong Lyu, New Taipei (TW); Po-chang Lu, Taoyuan District (TW); Chung-Yi Pan, New Taipei (TW)

(73) Assignee: Google LLC, Mountain View, CA (US)

( * ) Notice: Subject to any disclaimer, the term of this patent is extended or adjusted under 35 U.S.C. 154(b) by 304 days.

(21) Appl. No.: 18/001,043

(22) PCT Filed: Sep. 4, 2020

(86) PCT No.: PCT/US2020/049514
§ 371 (c)(1),
(2) Date: Dec. 7, 2022

(87) PCT Pub. No.: WO2022/050957
PCT Pub. Date: Mar. 10, 2022

(65) Prior Publication Data
US 2023/0269313 A1 Aug. 24, 2023

(51) Int. Cl.
H04M 1/02 (2006.01)
G06F 1/16 (2006.01)
G06F 1/26 (2006.01)

(52) U.S. Cl.
CPC ........ *H04M 1/0214* (2013.01); *G06F 1/1683* (2013.01); *G06F 1/263* (2013.01)

(58) Field of Classification Search
CPC ..... H04M 1/0214; G06F 1/1683; G06F 1/263
See application file for complete search history.

(56) References Cited

U.S. PATENT DOCUMENTS

| | | | |
|---|---|---|---|
| 12,237,686 B2 * | 2/2025 | Hartley | G01R 19/2513 |
| 2004/0041568 A1 * | 3/2004 | Yang | H02J 7/007182 |
| | | | 324/426 |

(Continued)

FOREIGN PATENT DOCUMENTS

WO    2020159966 A1    8/2020

OTHER PUBLICATIONS

Response to Communication Pursuant to Rules 161(1) and 162 EPC dated Dec. 15, 2022, from counterpart European Application No. 20775524.0, filed May 31, 2023, 4 pp.

(Continued)

*Primary Examiner* — Lewis G West
(74) *Attorney, Agent, or Firm* — Shumaker & Sieffert, P.A.

(57) ABSTRACT

An example foldable mobile computing device includes a first side including a first power storage device coupled to a first regulator. The device includes a second side including a second power storage device coupled to a second regulator and connected in parallel with the first power storage device. The second side is configured to articulate relative to the first side about a hinge. The device includes processing circuitry configured to determine a power storage capacity of the first power storage device and to determine a power storage capacity of the second power storage device. The device is also configured to adjust, based on the power storage capacity of the first power storage device and the power storage capacity of the second power storage device, at least one of an impedance of the first regulator or an impedance of the second regulator.

20 Claims, 7 Drawing Sheets

(56) References Cited

U.S. PATENT DOCUMENTS

| | | | |
|---|---|---|---|
| 2006/0160585 A1* | 7/2006 | Miyagawa | H04M 1/0214 455/575.7 |
| 2008/0171581 A1* | 7/2008 | Rhee | H04M 1/0216 455/575.3 |
| 2008/0233469 A1 | 9/2008 | Drozdz et al. | |
| 2011/0101778 A1* | 5/2011 | Yang | H02J 7/0068 290/1 R |
| 2015/0219722 A1 | 8/2015 | Maluf et al. | |
| 2018/0254641 A1* | 9/2018 | Kadirvel | H02J 7/0031 |
| 2019/0081487 A1 | 3/2019 | Baby et al. | |
| 2019/0214831 A1 | 7/2019 | Kristjansson et al. | |
| 2020/0036198 A1* | 1/2020 | Kim | G06F 1/1635 |
| 2020/0395765 A1* | 12/2020 | Kristjansson | G06F 1/26 |
| 2023/0029175 A1* | 1/2023 | Cho | H01Q 21/06 |
| 2023/0179010 A1* | 6/2023 | Fei | H02J 7/0063 320/103 |
| 2023/0378773 A1* | 11/2023 | Chang | H02J 7/0018 |

OTHER PUBLICATIONS

International Search Report and Written Opinion of International Application No. PCT/US2020/049514 dated Jun. 1, 2021, 14 pp.
Communication pursuant to Article 94(3) EPC from counterpart European Application No. 20775524.0 dated Nov. 13, 2024, 7 pp.
Response to Communication pursuant to Article 94(3) EPC dated Nov. 13, 2024, from counterpart European Application No. 20775524.0, filed Feb. 28, 2025, 15 pp.

* cited by examiner

UNEVEN LOAD MITIGATION IN A MOBILE COMPUTING DEVICE HAVING MULTIPLE POWER STORAGE DEVICES

BACKGROUND

Foldable mobile computing devices, such as mobile phones, may include a power storage device, such as a battery. The power storage device may be a relatively heavy component of the foldable mobile computing device. Some foldable mobile computing devices include a first power storage device located on one side of the fold and a second power storage device located on another side of the fold. By locating a first power storage device on one side of the fold and a second power storage device on the other side of the fold, the weight of the foldable mobile computing device may be relatively balanced when compared to a foldable mobile computing device having a single power storage device. In such an arrangement, one power storage device of a foldable mobile computing device having multiple power storage devices may be smaller than the other(s) power storage devices due to there being less available volume in one side of the fold for placement of the power storage device. Additionally, each power storage device may have a different current load due to the power storage devices being located on opposite sides of the fold.

BRIEF SUMMARY

A foldable mobile computing device may include at least two power storage devices, with at least one power storage device being located in a first side of the foldable mobile computing device and at least one power storage device being located in a second side of the mobile computing device. Due to various circumstances, the power storage devices may reach an empty charge state at different times. The mobile computing device may shutdown when either of the power storage devices reaches the empty charge state. As such, imbalances in discharge rates between the power storage devices may cause the mobile computing device to shutdown despite at least one of the power storage devices still having charge remaining.

In accordance with one or more aspects of this disclosure, the mobile computing device may include a first regulator electrically coupled to the first power storage device and/or a second regulator electrically coupled to a second power storage device. A controller of the foldable mobile computing device may adjust operation of the first regulator and/or the second regulator to balance discharge rates of the first and second power storage devices. For instance, based on a power storage capacity of the first power storage device and a power storage capacity of the second power storage device, the controller may adjust at least one of an impedance of the first regulator or an impedance of the second regulator. In this manner, aspects of this disclosure enable a prolonged runtime of the foldable mobile computing device. For instance, by balancing discharge rates between the power storage devices, the power storage devices may reach the empty charge state at approximately the same time. As such, the foldable mobile computing device may avoid prematurely shutting down when at least one power storage device still has charge remaining.

In one example, various aspects of the techniques are directed to a foldable mobile computing device including a first side including a first power storage device coupled to a first regulator. The foldable mobile computing device may also include a second side including a second power storage device coupled to a second regulator and connected in parallel with the first power storage device. The second side may be configured to articulate relative to the first side about a hinge. The foldable mobile computing device may include processing circuitry configured to determine a power storage capacity of the first power storage device. The processing circuitry may be configured to determine a power storage capacity of the second power storage device. The processing circuitry may be configured to adjust, based on the power storage capacity of the first power storage device and the power storage capacity of the second power storage device, at least one of an impedance of the first regulator or an impedance of the second regulator.

In another example, various aspects of the techniques are directed to a method including determining, by processing circuitry, a power storage capacity of a first power storage device located in a first side of a foldable mobile computing device. The method may include determining, by the processing circuitry, a power storage capacity of a second power storage device located in a second side of the foldable mobile computing device. The second side may be configured to articulate relative to the first side about a hinge. The method may also include adjusting, by the processing circuitry and based on power storage capacity of the first power storage device and the power storage capacity of the second power storage device, at least one of an impedance of a first regulator coupled to the first power storage device or an impedance of a second regulator coupled to the second power storage device.

In another example, various aspects of the techniques are directed to a foldable mobile computing device including a first side including a first power storage device coupled to a first regulator. The foldable mobile computing device may include a second side including a second power storage device coupled to a second regulator and connected in parallel with the first power storage device. The second side may be configured to articulate relative to the first side about a hinge. The foldable mobile computing device may include means for determining a power storage capacity of the first power storage device. The foldable mobile computing device may include means for determining a power storage capacity of the second power storage device. The foldable mobile computing device may also include means for adjusting, based on the power storage capacity of the first power storage device and the power storage capacity of the second power storage device, at least one of an impedance of the first regulator or an impedance of the second regulator.

Additional features, advantages, and embodiments of the disclosed subject matter may be set forth or apparent from consideration of the following detailed description, drawings, and claims. Moreover, it is to be understood both the foregoing summary and the following detailed description are illustrative and are intended to provide further explanation without limiting the scope of the claims.

DETAILED DESCRIPTION

Foldable mobile computing devices, such as foldable mobile phones, may include a power storage device. In a foldable mobile computing device, the power storage device may be one of the heaviest components. When utilizing a single power storage device, one side of the device may be much heavier than the other. A multiple power storage device structure may be used to better balance the weight on each side of the fold or hinge by placing a first power storage device on a first side and a second power storage device on a second side. Based on the available space on each side of a foldable device, the power storage devices may be different sizes.

The discharge current of a power storage device may be highly related to system impedance including an impedance of flexible printed circuit (FPC) that spans between sides of the device or a printed circuit board (PCB). Without impedance control and management, one power storage device may always stay under a heavier load than the other power storage device. This situation may accelerate the aging of the power storage device under the heavier load compared to the power storage device under a lighter load. Additionally, this situation may cause a shortened system operating time, which may require more frequent recharging, and which may result in an undesirable user experience.

According to the techniques of this disclosure, the device may utilize an adaptive impedance control scheme to balance the workload for each power storage device during discharge which may improve power storage device life and lengthen system operating time.

A system impedance of a foldable mobile computing device may be known or determinable based on the device structural design. According to the techniques of this disclosure, the foldable mobile computing device may determine an optimized or improved impedance of a regulator that may be increased or decreased to balance the power storage device load between the power storage devices. As the foldable device may determine the power storage device internal impedance from an onboard battery monitoring integrated circuit, e.g., a fuel gauge, the foldable mobile computing device may dynamically adjust the regulator impedance to achieve an optimized or improved balancing for each power storage device.

According to the techniques of this disclosure, the foldable device balances the workload of each power storage device so that the aging speed for the heavier loaded power storage device is not accelerated compared to the less loaded power storage device. This may extend the device's life cycle. Additionally, when one of power storage devices discharges to empty (e.g., 3.3V), the foldable device shuts down to prevent power storage device over discharge. The foldable device may align the empty trigger point for both power storage devices such that the empty trigger points are closer to each other's than the empty trigger points otherwise would be. This may extend the system operating time, allowing a user to recharge the batteries less frequently.

Figure 1:
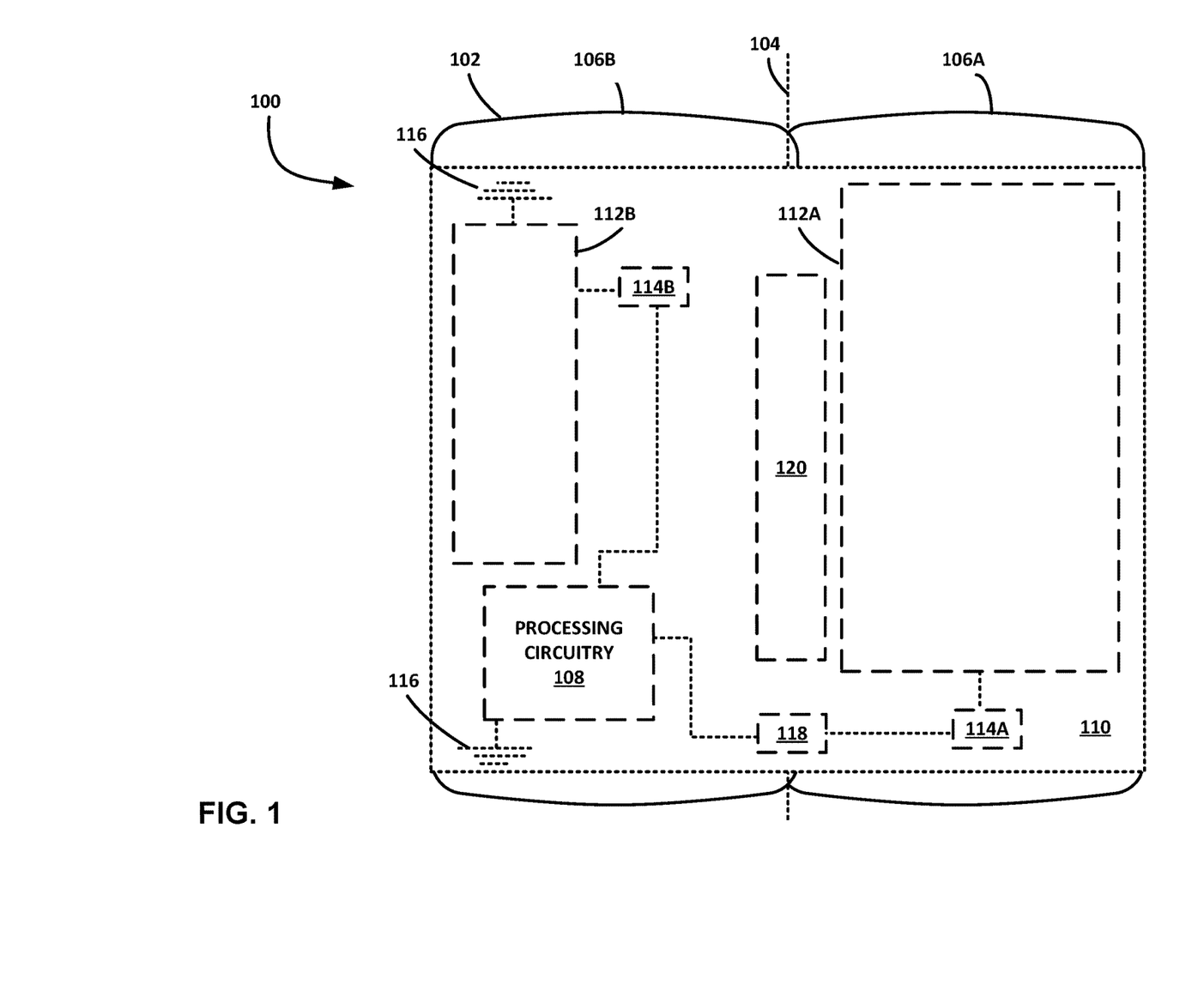
FIG. 1 is a block diagram illustrating a representation of a foldable mobile computing device in accordance with various aspects of the techniques described in this disclosure.

FIG. 1 is a block diagram illustrating a representation of a foldable mobile computing device in accordance with various aspects of the techniques described in this disclosure. Foldable mobile computing device 100 may represent any type of mobile computing device capable of folding along an axis 104, including along a centered axis or an off-center axis. While described herein with respect to foldable mobile computing device 100, any type of device capable of being powered by two or more power storage devices may be configured according to the techniques described in this disclosure. Examples of such devices may include a mobile phone (including a so-called "smartphone"), smart glasses, a smart watch, a portable speaker (including a portable smart speaker), a laptop computer, a portable gaming system, a wireless gaming system controller, and the like.

Foldable mobile computing device 100 may include a housing 102 having a hinge 120 or other element that enables folding along an axis 104, having a first side 106A and a second side 106B. Housing 102 may be formed from most any material such as metal (including aluminum), plastics (including most any polymer), glass, carbon fiber, etc. along with combinations of the materials in which first side 106A may have different or the same materials as second side 106B. In some examples, first side 106A may be the same or approximately the same size (within manufacturing tolerances) as second side 106B.

In other examples, first side 106A may be a different size than second side 106B. For example, first side 106A may only cover, when folded along axis 104, a portion of second side 106B (and not cover nearly the entirety of second side 106B). Similarly, in some examples, second side 106B may only cover, when folded along axis 104, a portion of first side 106A (and not cover nearly the entirety of first side 106A).

Foldable mobile computing device 100 may include processing circuitry 108 and a display 110 as well as other components and/or circuitry (which are not shown in the example of FIG. 1 for ease of illustration purposes), such as modem circuitry, global positioning system (GPS) electronics, accelerometers, gyroscopes, audio processing circuitry (e.g., a headphone jack and accompanying circuitry), one or more speakers, light emitting diodes (LEDs), one or more cameras, antenna(s), radio frequency circuitry, and the like.

Processing circuitry 108 may represent circuitry configured to support operation of foldable mobile computing device 100 and may execute software (or, in other words, a set of instructions) that may enable execution of hierarchical software layers to present various functionalities for use by a user. Processing circuitry 108 may, for example, execute a kernel forming a base layer by which an operating system may interface with various other processing units, such as a camera, microphones, sensors, etc. Processing circuitry 108 may also execute the operating system which presents an application space in which one or more applications (e.g., first party and/or third party applications) may execute to present graphical user interfaces with which to interact with the user. In some examples, processing circuitry 108 may include a battery monitoring integrated circuit that is different than an applications processor, not shown in FIG. 1 for simplicity purposes.

Processing circuitry 108 may include one or more of a microprocessor, a controller, a digital signal processor (DSP), a central processing unit (CPU), a graphics processing unit (GPU), an application specific integrated circuit (ASIC), a field-programmable gate array (FPGA), or equivalent discrete or integrated logic circuitry. The functions attributed to processing circuitry 108 in this disclosure may be embodied as software (as noted above), firmware, hardware and combinations thereof. Although example foldable mobile computing device 100 of FIG. 1 is illustrated as including one processing circuitry 108, other example foldable mobile computing devices according to this disclosure may include multiple processors (or multiple so-called "cores," which is another way to refer to processors when packaged together) configured to execute one or more functions attributed to processing circuitry 108 of foldable mobile computing device 100 individually or in different cooperative combinations.

Display 110 may represent a device configured to emit light via an array of pixels and thereby output an image or a sequence of images (e.g., video). Display 110 may include one or more of a liquid crystal display (LCD), dot matrix display, light emitting diode (LED) display, organic light-emitting diode (OLED) display, touch screen, e-ink, or similar monochrome or color display capable of providing visible information to users of foldable mobile computing device 100. Display 110 may provide a user interface related to functionality provided by foldable mobile computing device 100. Display 110 may include a presence-sensitive display and/or touch-sensitive display that may enable interactions with a graphical user interface presented by display 110.

Although shown as a single display 110, display 110 may represent one or more displays. In some examples, display 110 may represent a single display capable of folding along axis 104. In other examples, display 110 may represent two displays, where one display is housed within first side 106A and another display is housed within second side 106B. When two or more displays are included in device 100, each of the displays may operate to present a continuous user interface or separate user interfaces. As such, various aspects of the techniques may enable foldable mobile computing device 100 to operate with a single display or multiple displays.

Foldable mobile computing device 100 may also include a first power storage device 112A and a second power storage device 112B. First power storage device 112A may represent any type of electrical device capable of being charged via a power source (including fixed power sources accessible via electrical sockets, portable power sources, such as power banks comprised of, as one example, high wattage batteries, or wireless charging devices) and storing energy when unconnected from any power source. One example of first power storage device 112A is a battery, such as a lithium-ion battery, a nickel-cadmium battery, or any other type of rechargeable battery such as nickel-metal hydride, lead acid or lithium ion polymer.

Second power storage device 112B may be similar to first power storage device 112A, but may have a different wattage, power storage capacity (as defined in milliamp hour, or mAh), size, configuration, etc., such variation being referred to herein as asymmetrical. First power storage device 112A and second power storage device 112B may be referred to as batteries battery cells, cells, or battery packs. Various aspects of the techniques may be implemented with respect to any type of power storage device capable of powering a foldable mobile computing device 100 or any of the other devices discussed throughout this disclosure.

First power storage device 112A may be located in first side 106A. Second power storage device 112B may be located in second side 106B. In some examples, first power storage device 112A may be larger than second power storage device 112B as there may be less available space in second side 106B due to other components of foldable mobile computing device 100, such as processing circuitry 108, being located in second side 106B. The difference in size between first power storage device 112A and second power storage device 112B may result in a difference in power storage capacities. The difference in size between first power storage device 112A and second power storage device 112B may also result in a difference in an impedance of first power storage device 112A and an impedance of second power storage device 112B. In some examples the impedance of each or either of first power storage device 112A or second power storage device 112B may be referred to as a pack impedance.

To complete the circuit, ground 116 (which also may be referred to as "earth") is shown in the example of FIG. 1, which represents the reference point in an electrical circuit from which voltages are measured, a common return path for electric current, or a direct physical connection to the earth. Electrical circuits (e.g., processing circuitry 108) may be connected to ground 116 for several reasons (e.g., limiting the build-up of static electricity).

Foldable mobile computing device 100 may also include first regulator 114A which may be electrically coupled to first power storage device 112A. Foldable mobile computing device 100 may also include second regulator 114B which may be electrically coupled to second power storage device 112B. First regulator 114A and second regulator 114B may be circuitry configured to limit charging current during a charging event to avoid damaging first power storage device 112A and second power storage device 112B, respectively, during charging. Additionally, foldable mobile computing device may include a flexible printed circuit (FPC) 118. FPC 118 may electrically couple first regulator 114A to second side 106B, thereby enabling first power storage device 112A to power components, such as processing circuitry 108 located in second side 106B. As volume may be more limited in second side 106B than first side 106A, second power storage device 112B may be smaller than first power storage device 112A. First power storage device 112A and second power storage device 112B may have different power storage capacities and may discharge at different rates, which may lead to premature shut down of the foldable mobile computing device while at least one power storage device still has remaining charge.

Foldable mobile computing device 100 may include first side 106A and second side 106B. Second side 106B may be configured to articulate relative to first side 106A about hinge 120. Foldable mobile computing device 100 may include processing circuitry 108. In accordance with various aspects of the techniques described in this disclosure, foldable mobile computing device 100 may include first side 106A including first power storage device 112A electrically coupled to first regulator 114A. Foldable mobile computing device 100 may also include second side 106B including second power storage device 112B electrically coupled to second regulator 114B. First power storage device 112A and second power storage device 112B may be connected to other circuitry, such as processing circuitry 108, in parallel (not shown in FIG. 1 for simplicity purposes). Processing circuitry 108 may be configured to determine a power storage capacity of first power storage device 112A. Processing circuitry 108 may be configured to determine a power storage capacity of second power storage device 112B. In some examples, processing circuitry 108 may determine the power storage capacity of first power storage device 112A or second power storage device 112B by looking the power storage capacity in memory (not shown in FIG. 1 for simplicity purposes). In some examples, processing circuitry may determine the power storage capacity of first power storage device 112A or second power storage device 112B by measuring the power storage capacity. Processing circuitry 108 may also be configured to adjust, based on the power storage capacity of first power storage device 112A and the power storage capacity of second power storage device 112B, at least one of an impedance of first regulator 114A or an impedance of second regulator 114B. In this way, foldable mobile computing device 100 may mitigate uneven loads placed upon first power storage device 112A and second power storage device 112B, extend the overall system operating time, and extend power storage device life.

Figure 2:
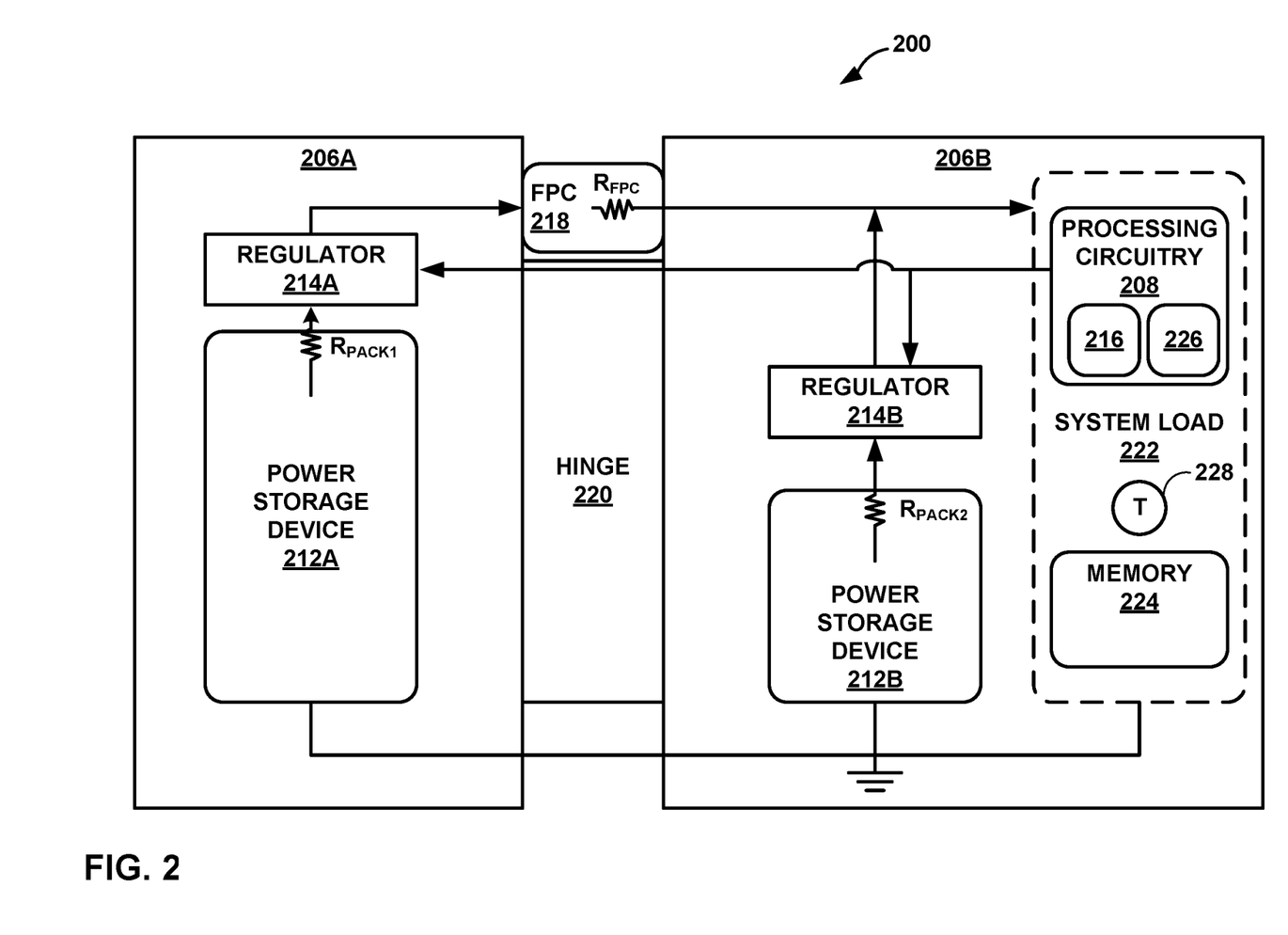
FIG. 2 is a block diagram illustrating another representation of a foldable mobile computing device in accordance with various aspects of the techniques described in this disclosure.

FIG. 2 is a block diagram illustrating another representation of a foldable mobile computing device in accordance with various aspects of the techniques described in this disclosure. Foldable mobile computing device 200 is depicted. Foldable mobile computing device 200 may be an example of foldable mobile computing device 100 of FIG. 1 and may function in a similar manner as described with respect to FIG. 1. Foldable mobile computing device 200 includes first side 206A and second side 206B. First side 206A includes first power storage device 212A electrically coupled to first regulator 214A. $R_{PACK1}$ represents an internal impedance of first power storage device 212A.

Second side 206B includes processing circuitry 208, which may function similarly to processing circuitry 108 of FIG. 1. Second side 206B may also include second power storage device 212B electrically coupled to second regulator 214B. $R_{PACK2}$ represents an internal impedance of second power storage device 212B.

Hinge 220 couples first side 206A to second side 206B. In this manner, second side 206B may articulate about hinge 220 with respect to first side 206A. FPC 218 electrically couples an output of first regulator 214A to second side 206B such that first power storage device 212A may be connected in parallel with second power storage device 212B and provide electrical power to device components represented by system load 222. In some examples, FPC 218 may be located external to hinge 220. In some examples, FPC 218 may be contained within hinge 220. In some examples, FPC 218 may be contained within a protective housing (not shown for simplicity purposes).

Processing circuitry 208 may include at least one battery monitoring integrated circuit 216. In some examples, the at least one battery monitoring integrated circuit 216 may be a fuel gage. In some examples, battery monitoring integrated circuit 216 may be configured to measure instantaneous current, remaining charge, power storage device capacity, impedance of power storage devices, etc. In some examples, battery monitoring integrated circuit 216 may be separate from an application processor 226 of processing circuitry 208.

In the example of FIG. 2, most or all of the key components of foldable mobile computing device 200 are in second side 206B. Thus, the remaining space is limited for second power storage device 212B. Therefore, the size of second power storage device 212B may be smaller than first power storage device 212A. Absent the techniques of this disclosure, during discharge, second power storage device 212B may supply a larger current load than first power storage device 212A due to $R_{PACK2}$ impedance and the size of second power storage device 212B being smaller than that of first power storage device 212A. This unbalanced discharge may cause second power storage device 212B to have a lower power storage capacity than first power storage device 212A both when the foldable mobile computing device is powered on and over the course of operation. Second power storage device 212B may therefore drain to 0% earlier than first power storage device 212A and this may trigger a system shutdown. Thus, there may be usable capacity of first power storage device 212A that is not being used. Also, because second power storage device 212B may always be under a relatively heavier load, second power storage device 212B may age more quickly than first power storage device 212A.

First power storage device 212A may encounter an additional impedance than second power storage device 212B. For example, first power storage device 212A may encounter an impedance $R_{FPC}$ of FPC 218 which electrically couples first regulator 214A in first side 206A to system load 222 in second side 206B. Thus, the total impedance encountered by first power storage device 212A may be higher than the total impedance encountered by second power storage device 212B.

A simplified version of the equivalent impedance for each power storage device may be represented by the formulas: $R_1=R_{FPC}+R_{PACK1}$; $R_2=R_{PACK2}$, where $R_{FPC}$ is the impedance of FPC 218 coupling first power storage device 212A to system load 222 located in second side 206B of foldable mobile computing device 200, $R_{PACK1}$ is the impedance of first power storage device 212A, and $R_{PACK2}$ is the impedance of second power storage device 212B. Because $R_1$ includes the impedance of FPC 218 ($R_{FPC}$), $R_1$'s impedance may always be larger than $R_2$'s ($R_1 > R_2$).

Based on theoretical analysis to effectively balance a workload between first power storage device 212A and second power storage device 212B, the R ratio ($R_1/R_2$) should be inversely proportional to a capacity ratio ($Cap_1/Cap_2$). Therefore, if the size of second power storage device is smaller than first power storage device, R2 should be bigger than R1.

According to the techniques of this disclosure, foldable mobile computing device 200 may use an adaptive impedance control scheme to adjust an impedance of first regulator 214A and/or an impedance of second regulator 214B based on existing impedances of FPC 218, first power storage device 212A, and second power storage device 212B to improve or optimize the R ratio during discharge. Foldable mobile computing device 200 may not only provide the initial improved or optimized R ratio, but may also timely monitor the percentage state-of-charge (SOC) gap between first power storage device 212A and second power storage device 212B and/or aging level of first power storage device 212A and/or second power storage device 212B to change the R ratio dynamically so as to improve or optimize the R ratio over time. For example, when foldable mobile computing device 200 determines the SOC gap between first power storage device 212A and second power storage device 212B is over a predetermined threshold (2% for example), foldable mobile computing device 200 may automatically adjust the impedance of first regulator 214A or the impedance of second regulator 214B to reduce or minimize the difference in SOCs. Additionally, or alternatively, when foldable mobile computing device 200 determines one of first power storage device 212A or second power storage device 212B is aging faster than the other (e.g., holding a lower percentage of charge of a capacity at a previous time, such as when new), foldable mobile computing device 200 may automatically adjust the impedance of first regulator 214A or the impedance of second regulator 214B to reduce or minimize the difference in aging levels.

In some examples, foldable mobile computing device 200 may include temperature sensor 228. Foldable mobile computing device 200 may determine a temperature of the folding mobile computing device based on measurements by temperature sensor 228. In some examples, foldable mobile computing device 200 may adjust t least one of the impedance of the first regulator or the impedance of the second regulator further based on the determined temperature.

In a test of power storage device workloads, first power storage device 212A's workload was found to be 26.3%, and second power storage device 212B's workload was found to be 34.6%. Second power storage device 212B's aging level was worse than first power storage device 212A's aging level (e.g., second power storage device 212B was aging faster than first power storage device 212A). According to the techniques of this disclosure, when foldable mobile computing device 200 increased second regulator 214B's impedance, foldable mobile computing device 200 better balanced the workload for first power storage device 212A and second power storage device 212B. According to the techniques of this disclosure, foldable mobile computing device 200 increasing second regulator 214B's impedance resulted in a benefit of extra power capacity of 2889 mAh which may extend the overall system operating time. In the test, the capacity of first power storage device 212A was 3800 mAh; the capacity of second power storage device 212B was 2800 mAh; the system current was 2 A; the initial $R_1$ was 116 mohms; and the initial $R_2$ was 58 mohms.

The following is a voltage and current theoretical analysis. A power storage capacity for first power storage device 212A and second power storage device 212B may be calculated as shown below.

$$V_{BAT1} = V_{SYS} + I_{BAT1} * R_1 \quad (1)$$

$$V_{BAT2} = V_{SYS} + I_{BAT2} * R_2 \quad (2)$$

where $V_{BAT1}$ is a voltage of first power storage device 212A, $V_{SYS}$ is a system voltage, $I_{BAT1}$ is a discharge current of first power storage device 212A, $R_1$ is the impedance $R_{PACK1}$+ the impedance $R_{FPC}$, $V_{BAT2}$ is a voltage of second power storage device 212B, $I_{BAT2}$ is a discharge current of the second power storage device 212B, and $R_2$ is the impedance $R_{PACK2}$.

If the power storage device discharge curve is assumed to be linear, for an ideal case, power storage device discharge current may be simplified to be proportional to the capacity. For example, $$I_{BAT1} = (Cap_1/(Cap_1+Cap_2))*I_{SYS} \quad (3)$$

$$I_{BAT2} = (Cap_2/(Cap_1+Cap_2))*I_{SYS} \quad (4)$$

where $Cap_1$ is the capacity of first power storage device 212A, $Cap_2$ is the capacity of second power storage device 212B, and $I_{SYS}$ is a system current.

Equations 3 and 4 may be substituted into Equations 1 and 2 as follows $$V_{BAT1} = V_{SYS} + (Cap_1/(Cap_1+Cap_2))*I_{SYS}*R_1 \quad (5)$$

$$V_{BAT2} = V_{SYS} + (Cap_2/(Cap_1+Cap_2))*I_{SYS}*R_2 \quad (6)$$

In order to achieve a voltage balance between first power storage device 212A and second power storage device 212B and keep the two power storage capacities approximately the same, target impedances $R_1$ and $R_2$ are estimated to be inversely proportional to capacities $Cap_1$ and $Cap_2$ as follows:

$$R_1/R_2 = Cap_2/Cap_1 \quad (7)$$

According to the techniques of this disclosure, foldable mobile computing device 200 may adjust an impedance of first regulator 214A and/or an impedance of second regulator 214B based on existing impedances of FPC 218 ($R_{FPC}$), an impedance of a PCB, impedance of first power storage device 212A ($R_{PACK1}$), and impedance of second power storage device 212B ($R_{PACK2}$) to attempt to match the R ratio so that $R_1/R_2 = Cap_2/Cap_1$ as an initial setting, for example. The power storage device impedances may change over time. According to the techniques of this disclosure, foldable mobile computing device 200 may adjust the ratio of $R_1$ and $R_2$ over time, by adjusting an impedance of first regulator 214A and/or an impedance of second regulator 214B over time. In this manner, foldable mobile computing device 200 may improve or optimize the system runtime and mitigate or avoid one power storage device aging more quickly than the other power storage device.

Figure 3:
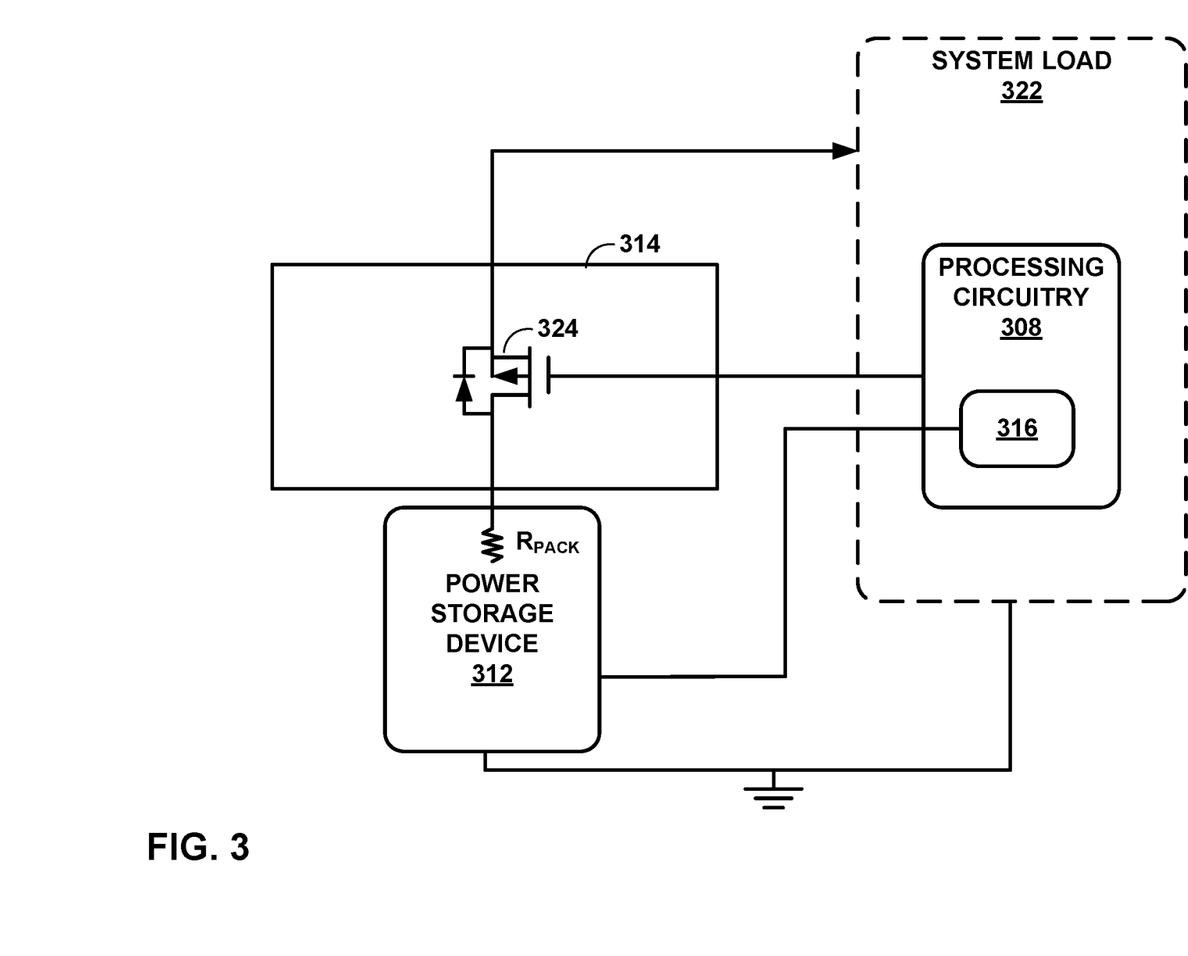
FIG. 3 is a diagram illustrating a schematic representation of a regulator coupled to a power storage device and processing circuitry in accordance with examples of the present disclosure.

FIG. 3 is a diagram illustrating a schematic representation of a regulator coupled to a power storage device and processing circuitry in accordance with examples of the present disclosure. Regulator 314 may be an example of any of the regulators of FIGS. 1-2. Power storage device 312 (which may be an example of any of the power storage devices of FIG. 1 or 2) is electrically coupled to regulator 314. $R_{PACK}$ represents the impedance of power storage device 312. Power storage device 312 supplies power to components of a foldable mobile computing device represented by system load 322. Processing circuitry 308 may function similarly to processing circuitry 108 of FIG. 1 or processing circuitry 208 of FIG. 2. Processing circuitry 308 may include a battery monitoring integrated circuit 316 which may monitor power storage device 312 and may determine an impedance $R_{PACK}$ of power storage device 312. Processing circuitry 308 may be electrically coupled to regulator 314. In accordance with the techniques of this disclosure, processing circuitry 308 may be electrically coupled to a gate of transistor 324 in regulator 314. Processing circuitry 308 may drive transistor 324 to adjust the impedance of regulator 314 so as to improve or optimize an impedance ratio between power storage device 312 and another power storage device (not shown in FIG. 3 for simplicity purposes).

Figure 4:
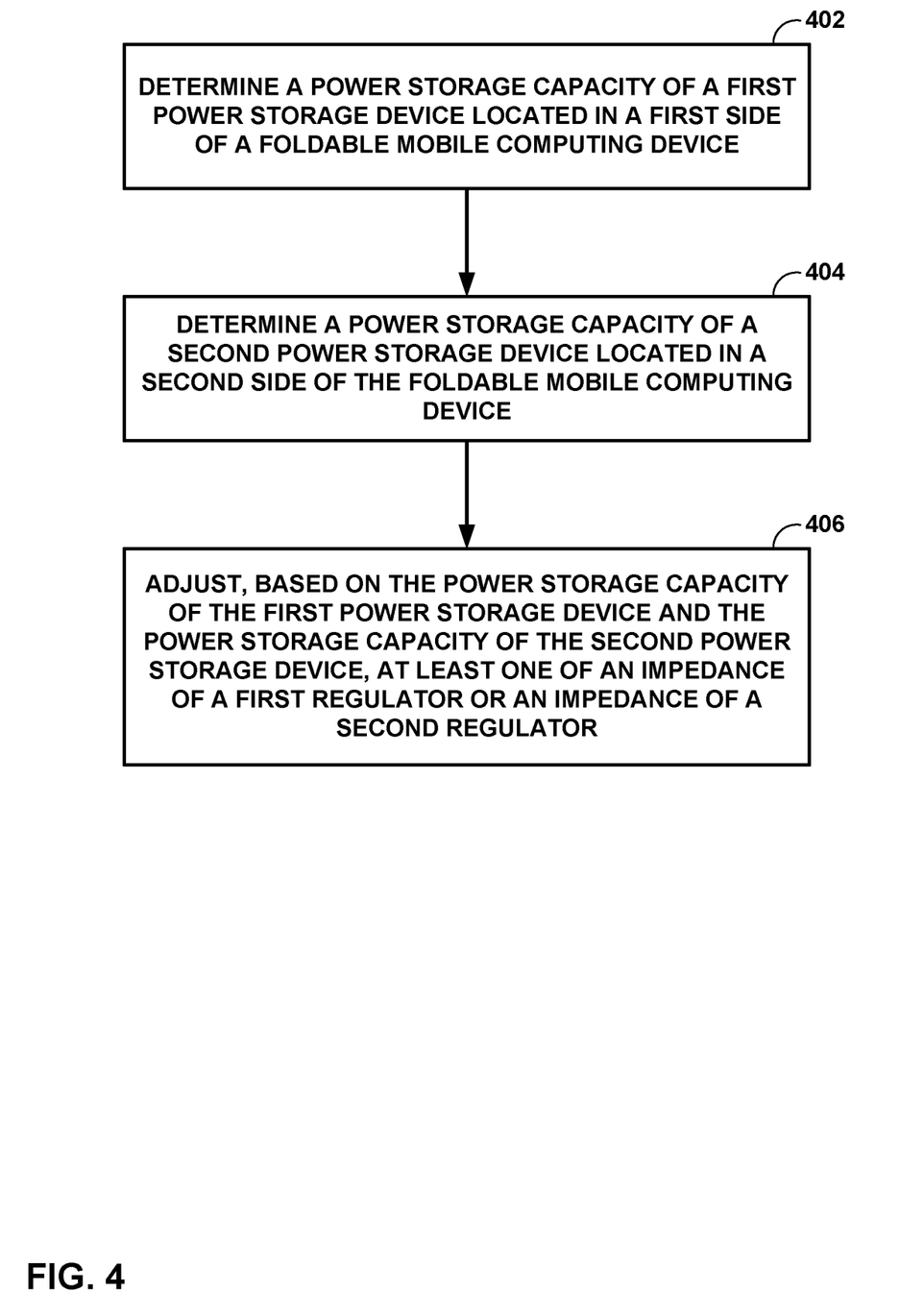
FIG. 4 is a flow diagram illustrating example operation of uneven load mitigation in a foldable mobile computing device in accordance with examples of the present disclosure.

FIG. 4 is a flow diagram illustrating example operation of uneven load mitigation in a foldable mobile computing device in accordance with examples of the present disclosure. Processing circuitry 208 may determine a power storage capacity of first power storage device 212A (402). For example, battery monitoring integrated circuit 216 of processing circuitry 208 determine a power storage capacity of first power storage device 212A. Processing circuitry 208 may determine a power storage capacity of second power storage device 212B (404). For example, battery monitoring integrated circuit 216 of processing circuitry 208 determine a power storage capacity of second power storage device 212B. Processing circuitry 208 may adjust, based on the power storage capacity of first power storage device 212A and the power storage capacity of second power storage device 212B, at least one of an impedance of first regulator 214A or an impedance of second regulator 214B (406).

In some examples, the power storage capacity of first power storage device 212A is different than the power storage capacity of second power storage device 212B. For example, the power storage capacity of first power storage device 212A may be a different number of mAh than the power storage capacity of second power storage device 212B.

Figure 5:
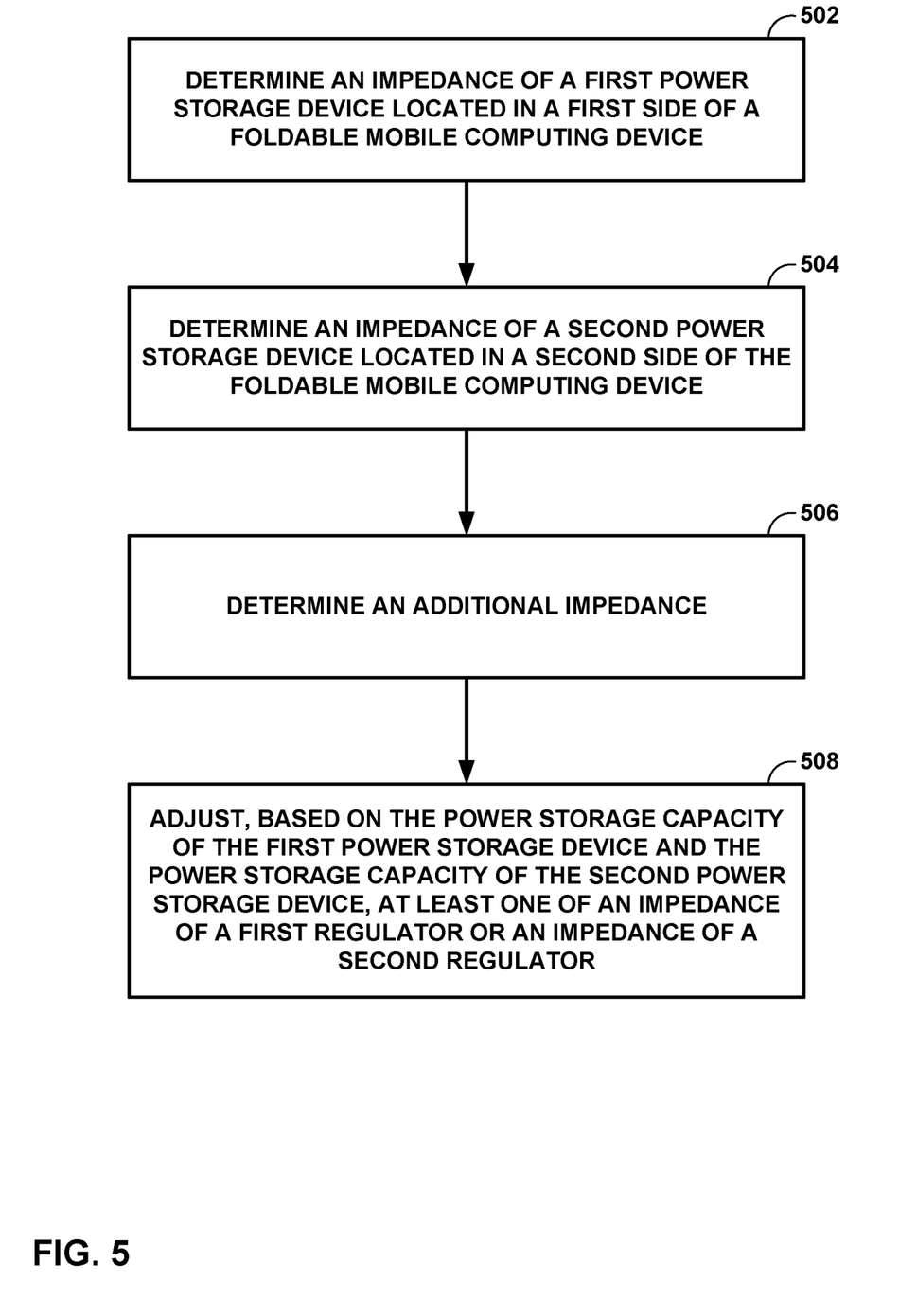
FIG. 5 is a flow diagram illustrating another example operation of uneven load mitigation in a foldable mobile computing device in accordance with examples of the present disclosure.

FIG. 5 is a flow diagram illustrating another example operation of uneven load mitigation in a foldable mobile computing device in accordance with examples of the present disclosure. The techniques of FIG. 5 may be used in combination with any other techniques of this disclosure or may be used separately. Processing circuitry 208 may determine an impedance of first power storage device 212A (502). For example, battery monitoring integrated circuit 216 of processing circuitry 208 may determine the impedance $R_{PACK1}$ of the first power storage device 212A. Processing circuitry 208 may determine an impedance second power storage device 212B (504). For example, battery monitoring integrated circuit 216 of processing circuitry 208 may determine the impedance $R_{PACK2}$ of the second power storage device 212B.

For example, processing circuitry 208 may include at least one battery monitoring integrated circuit (e.g., battery monitoring integrated circuit 216). The at least one battery monitoring circuit may be different than an application processor 226 of foldable mobile computing device 200. In some example, the at least one battery monitoring integrated circuit determines the impedance of first power storage device 212A and the impedance of second power storage device 212B.

Processing circuitry 208 may determine an additional impedance (506). In some examples, the additional impedance (e.g., the impedance $R_{FPC}$ of FPC 218) may be calculated in a laboratory or in a factory setting and the value of the additional impedance may be stored in memory 224. For example, processing circuitry 208 may determine the additional impedance by looking up the additional impedance in memory 224. In other examples, processing circuitry 208 may measure the additional impedance. In some examples, foldable mobile computing device includes at least one component that is different than first power storage device 212A and second power storage device 212B and the additional impedance includes an impedance of the at least one component. In some examples, the at least one component includes FPC 218 and FPC 218 may be configured to transfer electrical power from first side 206A to second side 206B.

In some examples, processing circuitry 208 may adjust, based on the impedance of first power storage device 212A, the impedance of second power storage device 212B, and the additional impedance, the at least one of the impedance of first regulator 214A or the impedance of second regulator 214B (508). For example, processing circuitry 208 may adjust the at least one of the impedance of first regulator 214A or the impedance of the second regulator 214B by driving a gate of a transistor (such as transistor 324 of FIG. 3) in at least one of first regulator 214A or second regulator 214B. In some examples, processing circuitry 208 may adjust the at least one of the impedance of first regulator 214A or the impedance of second regulator 214B such that the sum of the impedance of first power storage device 212A, the additional impedance, and the impedance of first regulator 214A divided by the sum of the impedance of second power storage device 212B and the impedance of second regulator 214B is equal to the power storage capacity of second power storage device 212B divided by the power storage capacity of first power storage device 214A. For example, processing circuitry 208 may adjust the at least one of the impedance of first regulator 214A or the impedance of second regulator 214B such that $(R_{PACK1}+R_{FPC}+\text{the impedance of first regulator } 214A)/(R_{PACK2}+\text{the impedance of second power storage device } 212B)=Cap_2/Cap_1$.

Figure 6:
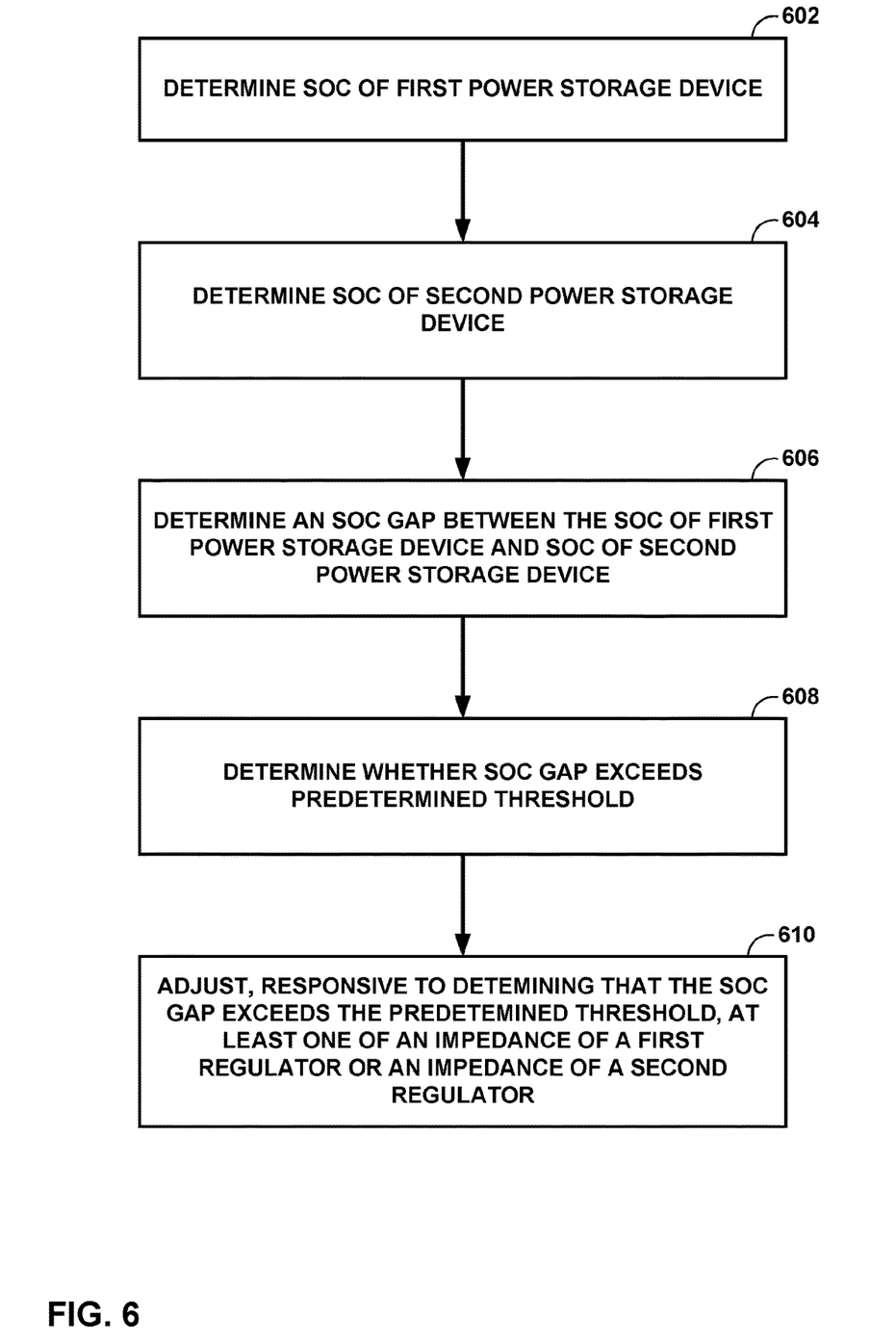
FIG. 6 is a flow diagram illustrating another example operation of uneven load mitigation in a foldable mobile computing device in accordance with examples of the present disclosure.

FIG. 6 is a flow diagram illustrating another example operation of uneven load mitigation in a foldable mobile computing device in accordance with examples of the present disclosure. The techniques of FIG. 6 may be used in combination with any other techniques of this disclosure or may be used separately. Processing circuitry 208 may determine a state-of-charge (SOC) of first power storage device 212A (602). For example, battery monitoring integrated circuit 216 of processing circuitry 208 may determine the SOC of first power storage device 212A. Processing circuitry 208 may determine an SOC of second power storage device 212B (604). For example, battery monitoring integrated circuit 216 of processing circuitry 208 may determine the SOC of first power storage device 212A. Processing circuitry 208 may determine an SOC gap between the SOC of first power storage device 212A and the SOC of second power storage device 212B (606). For example, processing circuitry 208 may subtract one of the SOC of first power storage device 212A or the SOC of second power storage device 212B from the other to determine the SOC gap. Processing circuitry 208 may determine whether the SOC gap exceeds a predetermined threshold (608). For example, processing circuitry may compare the SOC gap to a predetermined threshold, such as 2%, which may be stored in memory 224, and determine whether the SOC gap exceeds that predetermined threshold. Processing circuitry 208 may adjust, responsive to determining that the SOC gap exceeds the predetermined threshold, at least one of an impedance of first regulator 214A or an impedance of second regulator 214B (610).

Figure 7:
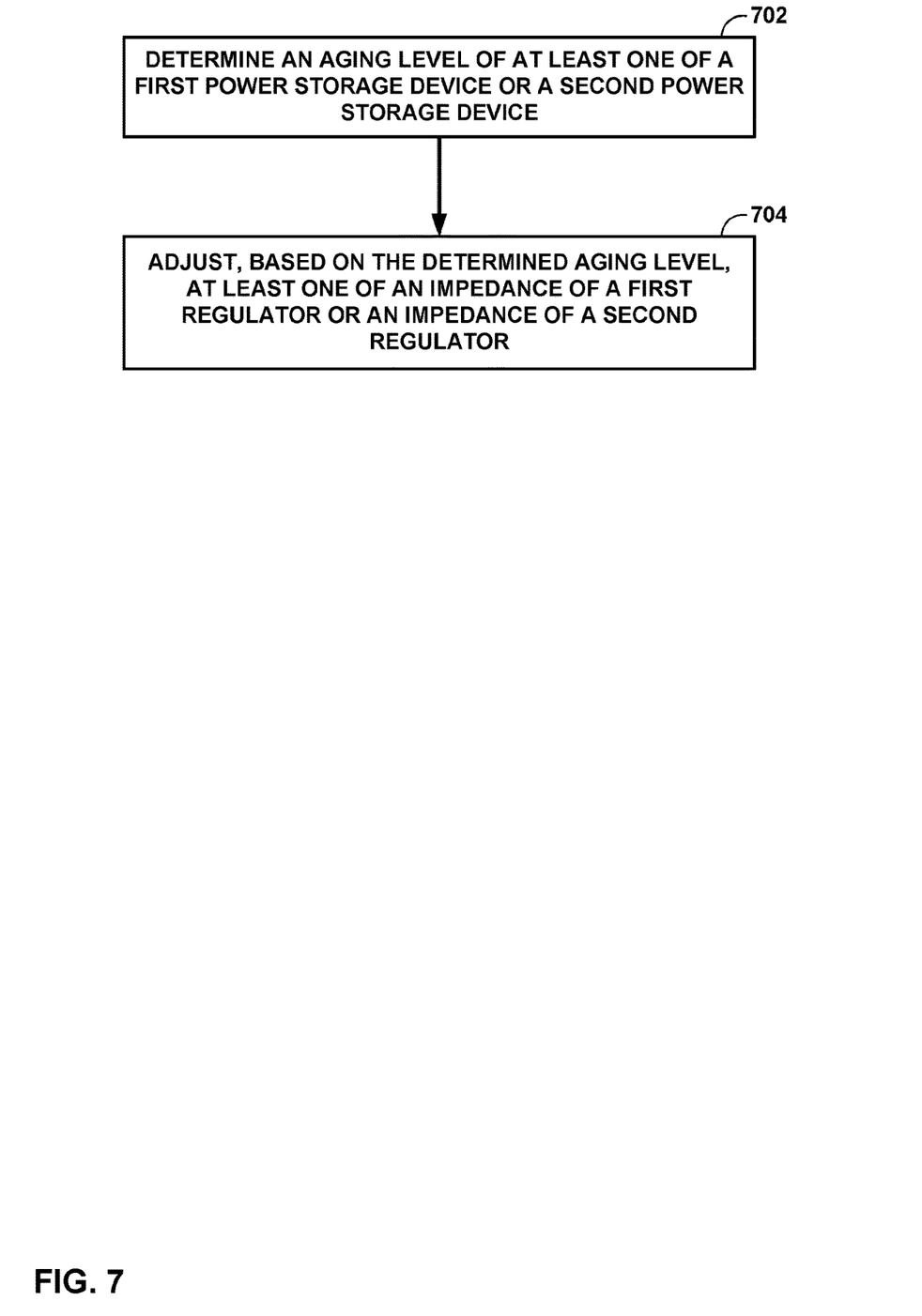
FIG. 7 is a flow diagram illustrating another example operation of uneven load mitigation in a foldable mobile computing device in accordance with examples of the present disclosure.

FIG. 7 is a flow diagram illustrating another example operation of uneven load mitigation in a foldable mobile computing device in accordance with examples of the present disclosure. The techniques of FIG. 7 may be used in combination with any other techniques of this disclosure or may be used separately. Processing circuitry 208 may determining an aging level of at least one of first power storage device 212A or second power storage device 212B (702). For example, battery monitoring integrated circuit may determine an aging level of at least one of first power storage device 212A or second power storage device 212B by determining a charge held at a fully charged state at a point in time compared to a charge held at a fully charged state at a previous time, such as when new. Processing circuitry 208 may adjust, based on the determined aging level, the at least one of the impedance of first regulator 214A or the impedance of second regulator 214B (704). For example, processing circuitry 208 may increase or decrease an impedance of first regulator 214A or second regulator 214B to attempt to balance the aging of first power storage device 212A and second power storage device 212B going forward.

According to the techniques of this disclosure, by adjusting an impedance of at least one of a first regulator or a second regulator, a foldable mobile computing device may balance power storage device discharge and aging such that the foldable mobile computing device may improve system operating time and extend power storage device life.

The foregoing description, for purpose of explanation, has been described with reference to specific implementations.

However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A foldable mobile computing device comprising:
a first side comprising a first power storage device coupled to a first regulator;
a second side comprising a second power storage device coupled to a second regulator and connected in parallel with the first power storage device, the second side configured to articulate relative to the first side about a hinge;
a system load including a single folding display spanning the first side and the second side, the system load operating using electrical energy received from a combination of the first regulator and the second regulator; and
processing circuitry configured to:
measure a power storage capacity of the first power storage device;
measure a power storage capacity of the second power storage device; and
adjust, based on the measured power storage capacity of the first power storage device and the measured power storage capacity of the second power storage device, at least one of an impedance of the first regulator or an impedance of the second regulator, wherein a physical size of the first power storage device is different than a physical size of the second power storage device.

2. The foldable mobile computing device of claim 1, wherein the power storage capacity of the first power storage device is different than the power storage capacity of the second power storage device.

3. The foldable mobile computing device of claim 1, wherein the processing circuitry is further configured to:
determine an impedance of the first power storage device;
determine an impedance of the second power storage device;
determine an additional impedance; and
adjust the at least one of the impedance of the first regulator or the impedance of the second regulator further based on the impedance of the first power storage device, the impedance of the second power storage device, and the additional impedance.

4. The foldable mobile computing device of claim 3, further comprising at least one component that is different than the first power storage device and the second power storage device, wherein the additional impedance comprises an impedance of the at least one component.

5. The foldable mobile computing device of claim 4, wherein the at least one component comprises a flexible printed circuit (FPC) configured to transfer electrical power from the first side to the second side.

6. The foldable mobile computing device of claim 3, wherein the processing circuitry comprises at least one battery monitoring integrated circuit that is different than an application processor of the foldable mobile computing device, wherein the at least one battery monitoring integrated circuit is configured to determine the impedance of the first power storage device, and determine the impedance of the second power storage device.

7. The foldable mobile computing device of claim 3, wherein the processing circuitry is configured to adjust the at least one of the impedance of the first regulator or the impedance of the second regulator such that a sum of the impedance of the first power storage device, the additional impedance, and the impedance of the first regulator divided by the sum of the impedance of the second power storage device and the impedance of the second regulator is equal to the power storage capacity of the second power storage device divided by the power storage capacity of the first power storage device.

8. The foldable mobile computing device of claim 1, wherein the processing circuitry is further configured to:
determine a state-of-charge (SOC) of the first power storage device;
determine an SOC of the second power storage device;
determine an SOC gap between the SOC of the first power storage device and the SOC of the second power storage device; and
determine whether the SOC gap exceeds a predetermined threshold,
adjust, responsive to determining that the SOC gap exceeds the predetermined threshold, the at least one of the impedance of the first regulator or the impedance of the second regulator.

9. The foldable mobile computing device of claim 1, wherein the processing circuitry is further configured to:
determine an aging level of at least one of the first power storage device or the second power storage device; and
adjust the at least one of the impedance of the first regulator or the impedance of the second regulator further based on the determined aging level.

10. The foldable mobile computing device of claim 1, wherein the processing circuitry is further configured to:
determine a temperature of the foldable mobile computing device; and
adjust the at least one of the impedance of the first regulator or the impedance of the second regulator further based on the determined temperature.

11. A method comprising:
measuring, by processing circuitry, a power storage capacity of a first power storage device located in a first side of a foldable mobile computing device;
measuring, by the processing circuitry, a power storage capacity of a second power storage device located in a second side of the foldable mobile computing device, the second side being configured to articulate relative to the first side about a hinge, wherein a physical size of the first power storage device is different than a physical size of the second power storage device;
adjusting, by the processing circuitry and based on the power storage capacity of the first power storage device and the power storage capacity of the second power storage device, at least one of an impedance of a first regulator coupled to the first power storage device or an impedance of a second regulator coupled to the second power storage device; and
operating, using electrical energy received from a combination of the first regulator and the second regulator, a system load including a single folding display spanning the first side and the second side.

12. The method of claim 11, wherein the power storage capacity of the first power storage device is different than the power storage capacity of the second power storage device.

13. The method of claim 11, further comprising:
- determining, by the processing circuitry, an impedance of the first power storage device;
- determining, by the processing circuitry, an impedance of the second power storage device;
- determining, by the processing circuitry, an additional impedance; and
- adjusting, by the processing circuitry and based on the impedance of the first power storage device, the impedance of the second power storage device, and an additional impedance, the at least one of the impedance of the first regulator or the impedance of the second regulator.

14. The method of claim 13, wherein the foldable mobile computing device comprises at least one component that is different than the first power storage device and the second power storage device, wherein the additional impedance comprises an impedance of the at least one component.

15. The method of claim 14, wherein the at least one component comprises a flexible printed circuit (FPC) configured to transfer electrical power from the first side to the second side.

16. The method of any combination of claim 13, wherein the processing circuitry comprises at least one battery monitoring integrated circuit that is different than an application processor of the foldable mobile computing device, and wherein the at least one battery monitoring integrated circuit determines the impedance of the first power storage device and the impedance of the second power storage device.

17. The method of claim 13, wherein adjusting, by the processing circuitry, the at least one of the impedance of the first regulator or the impedance of the second regulator comprises adjusting the at least one of the impedance of the first regulator or the impedance of the second regulator such that a sum of the impedance of the first power storage device, the additional impedance, and the impedance of the first regulator divided by the sum of the impedance of the second power storage device and the impedance of the second regulator is equal to the power storage capacity of the second power storage device divided by the power storage capacity of the first power storage device.

18. The method of claim 11, further comprising:
- determining, by the processing circuitry, a state-of-charge (SOC) of the first power storage device;
- determining, by the processing circuitry, an SOC of the second power storage device;
- determining, by the processing circuitry, an SOC gap between the SOC of the first power storage device and the SOC of the second power storage device; and
- determining, by the processing circuitry, whether the SOC gap exceeds a predetermined threshold,
- adjusting, by the processing circuitry and responsive to determining that the SOC gap exceeds the predetermined threshold, the at least one of the impedance of the first regulator or the impedance of the second regulator.

19. The method of claim 11, further comprising:
- determining an aging level of at least one of the first power storage device or the second power storage device; and
- adjusting, by the processing circuitry and based on the determined aging level, the at least one of the impedance of the first regulator or the impedance of the second regulator.

20. A foldable mobile computing device comprising:
- a first side comprising a first power storage device coupled to a first regulator;
- a second side comprising a second power storage device coupled to a second regulator and connected in parallel with the first power storage device, the second side configured to articulate relative to the first side about a hinge, wherein a physical size of the first power storage device is different than a physical size of the second power storage device;
- means for measuring a power storage capacity of the first power storage device;
- means for measuring a power storage capacity of the second power storage device;
- means for adjusting, based on the power storage capacity of the first power storage device and the power storage capacity of the second power storage device, at least one of an impedance of the first regulator or an impedance of the second regulator; and
- means for operating, using electrical energy received from a combination of the first regulator and the second regulator, a system load including a single folding display spanning the first side and the second side.

* * * * *